United States Patent
Hsiao et al.

(10) Patent No.: US 10,757,386 B2
(45) Date of Patent: Aug. 25, 2020

(54) WHITE BALANCE CALIBRATION METHOD BASED ON SKIN COLOR DATA AND IMAGE PROCESSING APPARATUS USING THE SAME

(71) Applicant: REALTEK SEMICONDUCTOR CORP., Hsinchu (TW)

(72) Inventors: Ching-Ju Hsiao, Tainan (TW); Wen-Tsung Huang, Chiayi (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 169 days.

(21) Appl. No.: 16/171,813

(22) Filed: Oct. 26, 2018

(65) Prior Publication Data
US 2019/0320152 A1 Oct. 17, 2019

(30) Foreign Application Priority Data
Apr. 13, 2018 (TW) .............................. 107112711 A

(51) Int. Cl.
G06T 7/00 (2017.01)
H04N 9/73 (2006.01)
G06T 7/90 (2017.01)
G06T 7/11 (2017.01)

(52) U.S. Cl.
CPC ................. *H04N 9/73* (2013.01); *G06T 7/11* (2017.01); *G06T 7/90* (2017.01); *G06T 2207/20021* (2013.01); *G06T 2207/30201* (2013.01)

(58) Field of Classification Search
CPC .... H04N 9/73; G06T 7/11; G06T 7/90; G06T 2207/20021; G06T 2207/30201
See application file for complete search history.

(56) References Cited

U.S. PATENT DOCUMENTS

| 5,881,171 | A | * | 3/1999 | Kinjo | G06K 9/00228 |
| | | | | | 382/199 |
| 8,717,459 | B2 | | 5/2014 | Zhang et al. | |
| 8,854,709 | B1 | * | 10/2014 | Liu | H04N 9/73 |
| | | | | | 348/223.1 |
| 2002/0145678 | A1 | * | 10/2002 | Suzuki | H04N 9/64 |
| | | | | | 348/675 |
| 2005/0007463 | A1 | * | 1/2005 | Xia | H04N 9/73 |
| | | | | | 348/223.1 |
| 2009/0067683 | A1 | * | 3/2009 | Takayama | H04N 1/6077 |
| | | | | | 382/118 |
| 2009/0097745 | A1 | * | 4/2009 | Kim | H04N 9/73 |
| | | | | | 382/167 |

(Continued)

*Primary Examiner* — Sean T Motsinger
(74) *Attorney, Agent, or Firm* — Li & Cai Intellectual Property (USA) Office

(57) ABSTRACT

Disclosed are a white balance calibration method based on skin color data and an image processing apparatus using the same. By using the method and the image processing apparatus, weight allocation of the skin color data in an input image may be adaptively performed to avoid white balance calibration errors due to excessive skin color data. Therefore, the present disclosure can further solve an issue that in video applications, the white balance calibration is easily interfered by a large amount of the skin color data. Moreover, the present disclosure may be adapted to different color temperatures and may output images having colors closer to actual colors.

20 Claims, 9 Drawing Sheets

(56) References Cited

U.S. PATENT DOCUMENTS

| | | | |
|---|---|---|---|
| 2012/0163712 A1* | 6/2012 | Nakajima | G06T 7/194 382/165 |
| 2013/0321700 A1* | 12/2013 | Cote | G06T 7/90 348/453 |
| 2013/0322745 A1* | 12/2013 | Lim | H04N 9/735 382/162 |
| 2013/0343646 A1* | 12/2013 | Hata | G06T 7/90 382/165 |
| 2014/0036106 A1* | 2/2014 | Ouchi | H04N 9/735 348/224.1 |
| 2017/0094240 A1* | 3/2017 | Saito | G06T 5/008 |
| 2017/0098136 A1* | 4/2017 | Kobayashi | G06K 9/3233 |
| 2018/0077395 A1* | 3/2018 | Kitajima | G06T 7/90 |
| 2018/0203204 A1* | 7/2018 | Suzuki | H04N 5/232122 |
| 2018/0249141 A1* | 8/2018 | Moriya | H04N 9/77 |
| 2018/0350048 A1* | 12/2018 | Tada | G06T 5/008 |
| 2019/0199990 A1* | 6/2019 | Wang | H04N 9/73 |
| 2019/0320152 A1* | 10/2019 | Hsiao | G06T 5/008 |

\* cited by examiner

WHITE BALANCE CALIBRATION METHOD BASED ON SKIN COLOR DATA AND IMAGE PROCESSING APPARATUS USING THE SAME

CROSS-REFERENCE TO RELATED PATENT APPLICATION

This application claims the benefit of priority to Taiwan Patent Application No. 107112711, filed on Apr. 13, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

BACKGROUND OF THE INVENTION

1. Field of the Invention

The present disclosure relates to a white balance calibration method and an image processing apparatus using the same; in particular, to a white balance calibration method based on skin color data and an image processing apparatus using the same.

2. Description of Related Art

Human eyes can adapt to colors at different color temperatures. Therefore, in human color vision, white is always perceived as white at different color temperatures. However, for an image processing apparatus, without a white balance calibration, white would look slightly blue under the sun but look slightly yellow with light from a low color temperature bulb. The white balance calibration is to calibrate these white colors at different color temperatures. With the white balance calibration, white colors at different color temperatures would be taken as the same color by an image processing apparatus.

Generally, white balance calibration methods include the Gray World method and the Perfect Reflector method. In the Gray World method, an average of each of RGB components is assumed to be close to the same gray scale. However, in this case, when an image is dominated by a single color, the white balance calibration cannot be effectively performed. In the Perfect Reflector method, it is assumed that the color of the pixel having the maximum brightness is white, and the whole image will be calibrated based on the pixel value of this pixel as a reference value. In this case, when the color of the pixel having the maximum brightness is not white, the white balance calibration cannot be effectively performed.

Specifically, in the Gray World method, a current gray scale is calculated by counting pixel values of all pixels, the image is divided into M*N windows, and a color average of the pixel value in each window is calculated. Then, according to the position coordinates of the M*N windows in a color space, white balance gains can be calculated. In order to improve the white balance calibration, a color temperature curve representing white at difference color temperatures will be calibrated. Then, a white region, covering the color temperature curve will be defined. Data in the white region are used to calculate the current gray scale.

In most video applications, the major part of a video image will be the face of a user, and the large amount of skin color data affects the result of the white balance calibration. In the color space, the distribution of the skin color data is close to the distribution of white at the low color temperatures. In the above white balance calibration methods, skin color data cannot be excluded from the white region. When the white balance calibration is applied to the skin color data, the skin color data may be considered a white color at a low color temperature. In this case, a larger blue gain will be provided, and the whole video image would look slightly blue. Accordingly, the skin color data has to be excluded from the white region.

SUMMARY OF THE INVENTION

The present disclosure provides a white balance calibration method and an image processing apparatus that can process an input image so that an output image will not be interfered with by skin color data. Even when input images are at different color temperatures, by using the present disclosure, colors of the output images can still be very close to colors in human color vision.

The white balance calibration method provided by the present disclosure based on skin color data can be adapted to an image processing apparatus. The method includes: receiving pixel data of an input image, wherein each pixel datum includes a first color component, a second color component and a third color component; dividing the input image into a plurality of blocks, and calculating a first average component of the first color components, a second average component of the second color components and a third average component of the third color components of each block; calculating first data and second data according to the first average component, the second average component and the third average component of each block; mapping each block to a position coordinate of a color space according to the first data and the second data, wherein a white region and a skin color region are built in the color space, the white region includes white colors at different color temperatures, and the skin color region includes skin colors at different color temperatures; determining whether a number of the blocks in an overlapping region of the white region and the skin color region is smaller than a predetermined number, and when the number of the blocks in the overlapping region of the white region and the skin color region is smaller than the predetermined number, calculating weighted averages of the first data and the second data of each block in the white region to generate a first weight value and a second weight value and converting the first weight value and the second weight value to a first gain value and a second gain value according to a predetermined precision, wherein a weight value of the first data and the second data used to calculate the first weight value and the second weight value is 1 or less; and adjusting the first color component, the second color component and the third color component of each of the pixel data according to the first gain value and the second gain value.

In one embodiment of the white balance calibration method provided by the present disclosure, the method further includes: when the number of the blocks in the overlapping region of the white region and the skin color region is larger than or equal to the predetermined number, averaging the first data and the second data of each block in the white region to generate a first average value and a second average value, and converting the first average value and the second average value to the first gain value and the second gain value according to the predetermined precision. It should be noted that, in this embodiment, the first average value is larger than the first weight value, and the second average value is larger than the second weight value.

The image processing apparatus provided by the present disclosure includes an image capturing device and an image processor. The image processor is electrically connected to the image capturing device. The image capturing device receives an input image, and the input image includes pixel data. The image processor is configured to: receive the pixel data of the input image, wherein each of the pixel data includes a first color component, a second color component and a third color component; divide the input image into a plurality of blocks, and calculate a first average component of the first color components, a second average component of the second color components and a third average component of the third color components of each block; calculate first data and second data according to the first average component, the second average component and the third average component for each block; map each block to a position coordinate of a color space according to the first data and the second data, wherein a white region and a skin color region are built in the color space, the white region includes white colors at different color temperatures, and the skin color region includes skin colors at different color temperatures; determine whether a number of the blocks in an overlapping region of the white region and the skin color region is smaller than a predetermined number, and when the number of the blocks in the overlapping region of the white region and the skin color region is smaller than the predetermined number, calculate weighted averages of the first data and the second data of each block in the white region to generate a first weight value and a second weight value and convert the first weight value and the second weight value to a first gain value and a second gain value according to a predetermined precision, wherein a weight value of each of the first data and each of the second data used to calculate the first weight value and the second weight value is 1 or less; and adjust the first color component, the second color component and the third color component of each pixel datum according to the first gain value and the second gain value.

To sum up, in the present disclosure, the white balance calibration method based on skin color data and the image processing apparatus using the same can adaptively perform a weight allocation based on the skin color data to generate white balance gains. The white balance gains can help avoid errors of the white balance calibration caused by excessive skin color data of the input image. Therefore, the present disclosure can further solve an issue that in video applications, the white balance calibration is easily interfered by a large amount of the skin color data so that colors in the output image can be closer to actual colors.

For further understanding of the present disclosure, reference is made to the following detailed description illustrating the embodiments of the present disclosure. The description is only for illustrating the present disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF EXEMPLARY EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings. In these drawings, like references indicate similar elements.

In the present disclosure, an input image is divided into a plurality of blocks and a pixel average value of each block is calculated. After that, a number of the blocks in a white region (including white colors at different color temperatures) and a number of the blocks in a skin color region (including skin colors at different color temperatures) are calculated. Then, a weight allocation of the blocks in the white region is performed according to the pixel average values of the blocks, the number of the blocks in the white region and the number of the blocks in the skin color region to generate white balance gains. Finally, each pixel of the input image is multiplied by a white balance gain to complete the whole white balance calibration process. The following descriptions are for illustrating the white balance calibration method based on the skin color data and the image processing apparatus in this disclosure.

Figure 1:
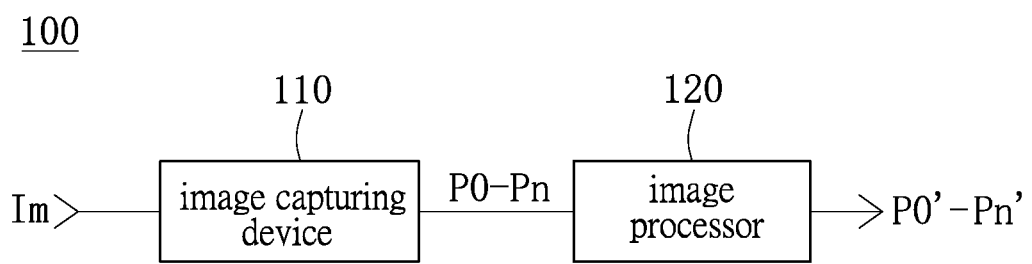
FIG. 1 shows a schematic diagram of an image processing apparatus according to one embodiment of the present disclosure.

FIG. 1 shows a schematic diagram of an image processing apparatus according to one embodiment of the present disclosure. As shown in FIG. 1, an image processing apparatus 100 executes a white balance calibration for each of pixel data P0 to Pn of an input image so that skin color data can be excluded from a white region, and each of pixel data P0 to Pn can be adjusted based on different color temperatures. After that, adjusted pixel data P0' to Pn' can be outputted. For example, the image processing apparatus 100 can be a smart phone, a digital camera, a monitoring system, a webcam or other image processing apparatuses that can execute the white balance calibration.

Figure 3:
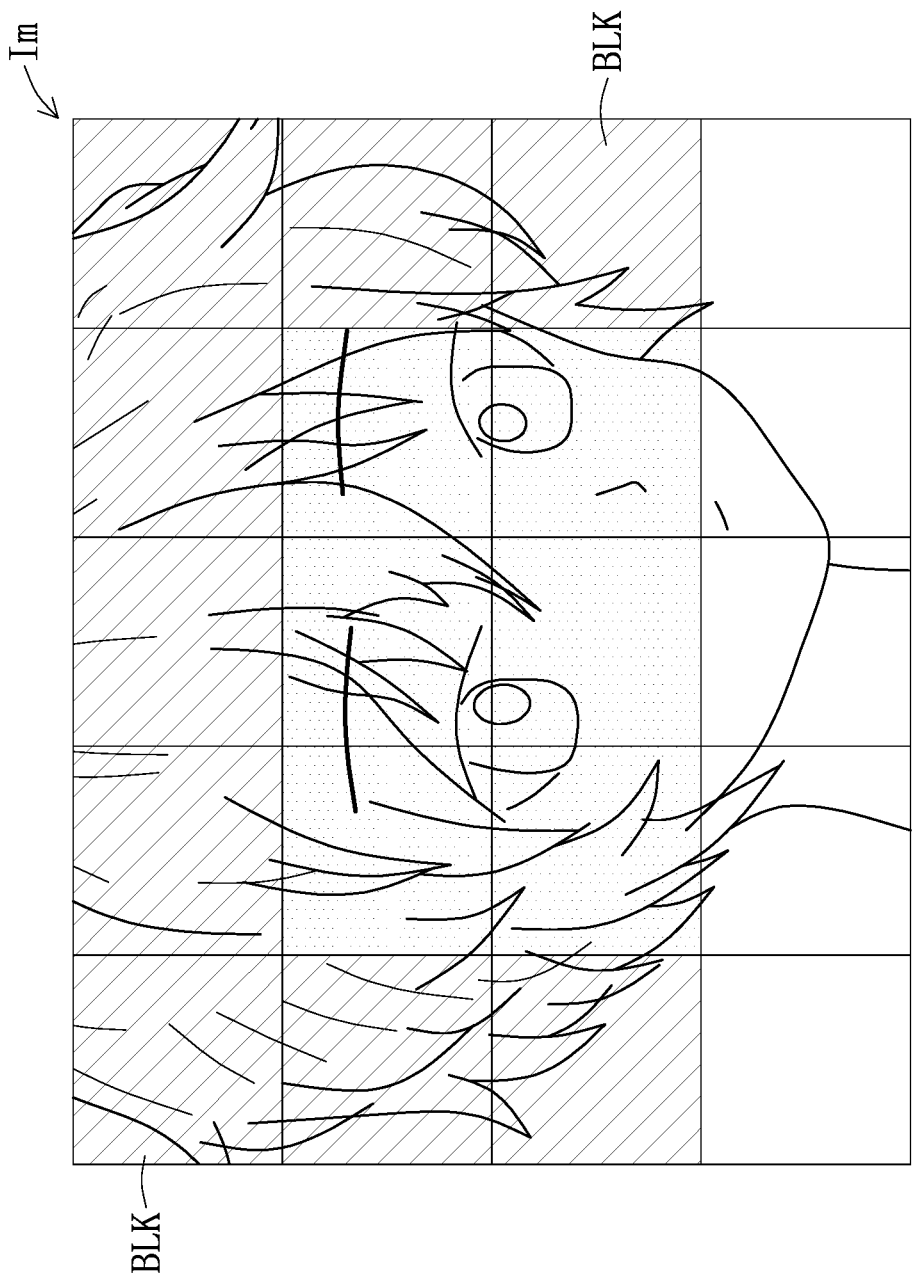
FIG. 3 is a schematic diagram showing pixel data of an input image according to one embodiment of the present disclosure.

The image processing apparatus 100 includes an image capturing device 110 and an image processor 120. FIG. 3 is a schematic diagram showing pixel data of an input image according to one embodiment of the present disclosure. As shown in FIG. 1 and FIG. 3, the image capturing device 110 receives an input image Im, and the input image Im includes the pixel data P0 to Pn. For example, the image capturing device 110 can be a camera, a video recorder or other electronic devices that can capture images. For ease of illustration, in the following description the input image Im has 15*12 pixel data (i.e., there are 15 pixel data in a row and 12 rows, which is 180 pixel data in total).

The image processor 120 is electrically connected to the image capturing device 110, and executes steps described in the following descriptions, such that the white balance calibration can be executed for each of the pixel data P0 to Pn of the input image Im. As a result, skin color data can be excluded from a white region, and each of the pixel data P0 to Pn can be adjusted based on different color temperatures. After that, adjusted pixel data P0' to Pn' can be outputted.

Figure 2:
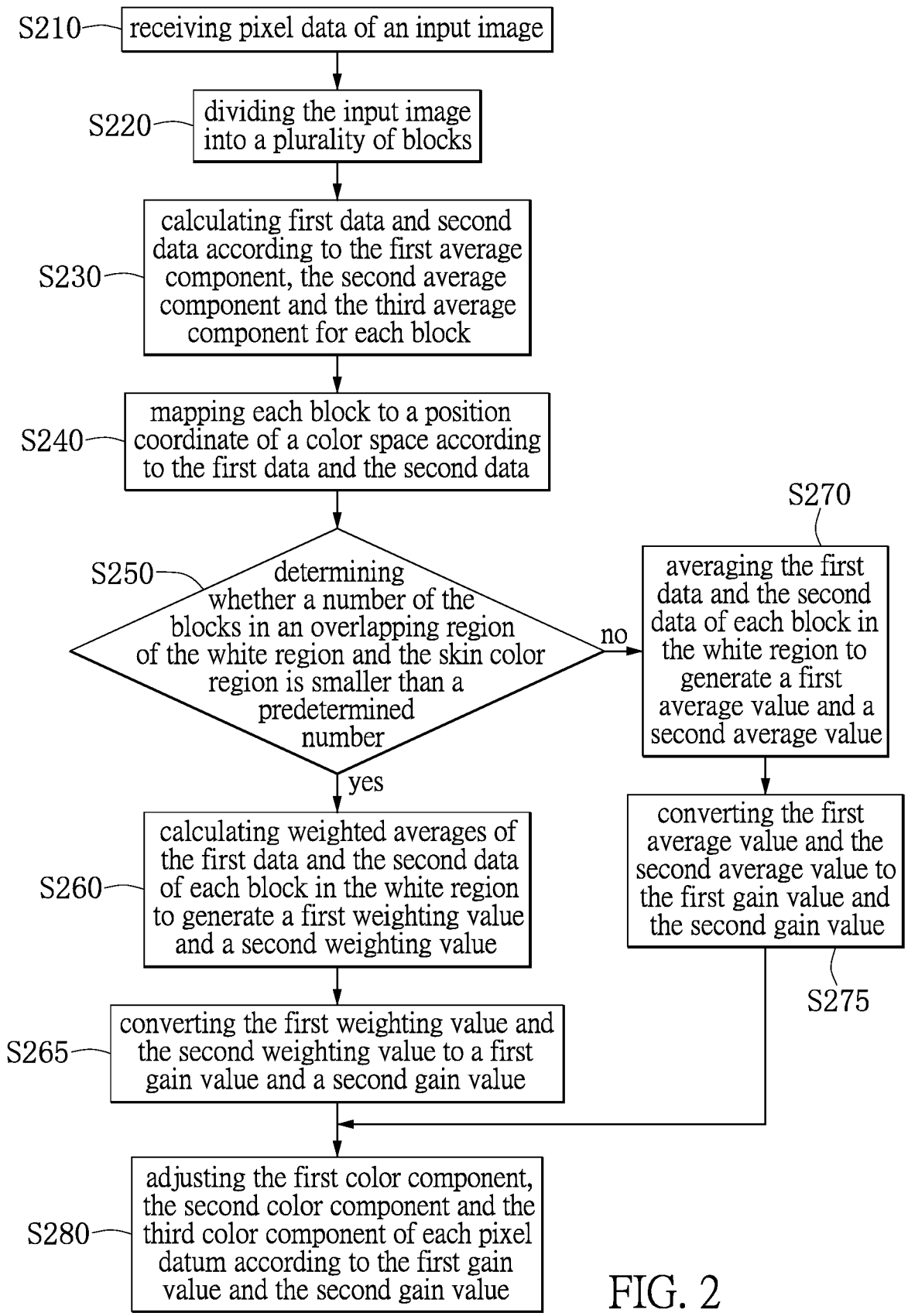
FIG. 2 shows a flow chart of a white balance calibration method based on skin color data according to one embodiment of the present disclosure.

FIG. 2 shows a flow chart of a white balance calibration method based on skin color data according to one embodiment of the present disclosure. In step S210, the image processor 120 receives each of the pixel data P0 to Pn of the input image Im. Each of the pixel data P0 to Pn includes a first color component, a second color component and a third color component. In this embodiment, the first color component refers to a red saturation R, the second color component refers to a green saturation G, and the third color component refers to a blue saturation B. In other words, the first color component, the second color component and the third color component are three components in a RGB color space. In another embodiment, the first color component refers to a brightness Y, the second color component refers to a blue chrominance Cb, and the third color component refers to a red chrominance Cr. In other words, the first color component, the second color component and the third color component are three components in a YCbCr color space. In other embodiments, the first color component, the second color component and the third color component can be components in other kinds of color spaces.

In step S220, the image processor 120 divides the input image Im into a plurality of blocks BLK, and calculates a first average component of the first color components, a second average component of the second color components and a third average component of the third color components of each block BLK. Specifically, in each block BLK, the image processor 120 averages the first color components to generate the first average component, averages the second color components to generate the second average component, and averages the third color components to generate the third average component.

In FIG. 3, there are 180 pixel data in the input image Im, and the first color component, the second color component and the third color component are three components in the RGB color space. The input image Im is divided into 20 blocks BLK, and each block BLK has 9 pixel data. In this embodiment, grey is an actual color of the first block to the sixth block, the tenth block, the 11$^{th}$ block and the 15$^{th}$ block (i.e., marked by oblique lines), and the actual color is a color not interfered with by the skin color data and the color temperature. In addition, orange is an actual color of the seventh block to the ninth block, and the 12$^{th}$ block to the 14$^{th}$ block (i.e., marked by dots), and yellow is an actual color of the 16$^{th}$ block to the 20$^{th}$ block.

Figure 4:
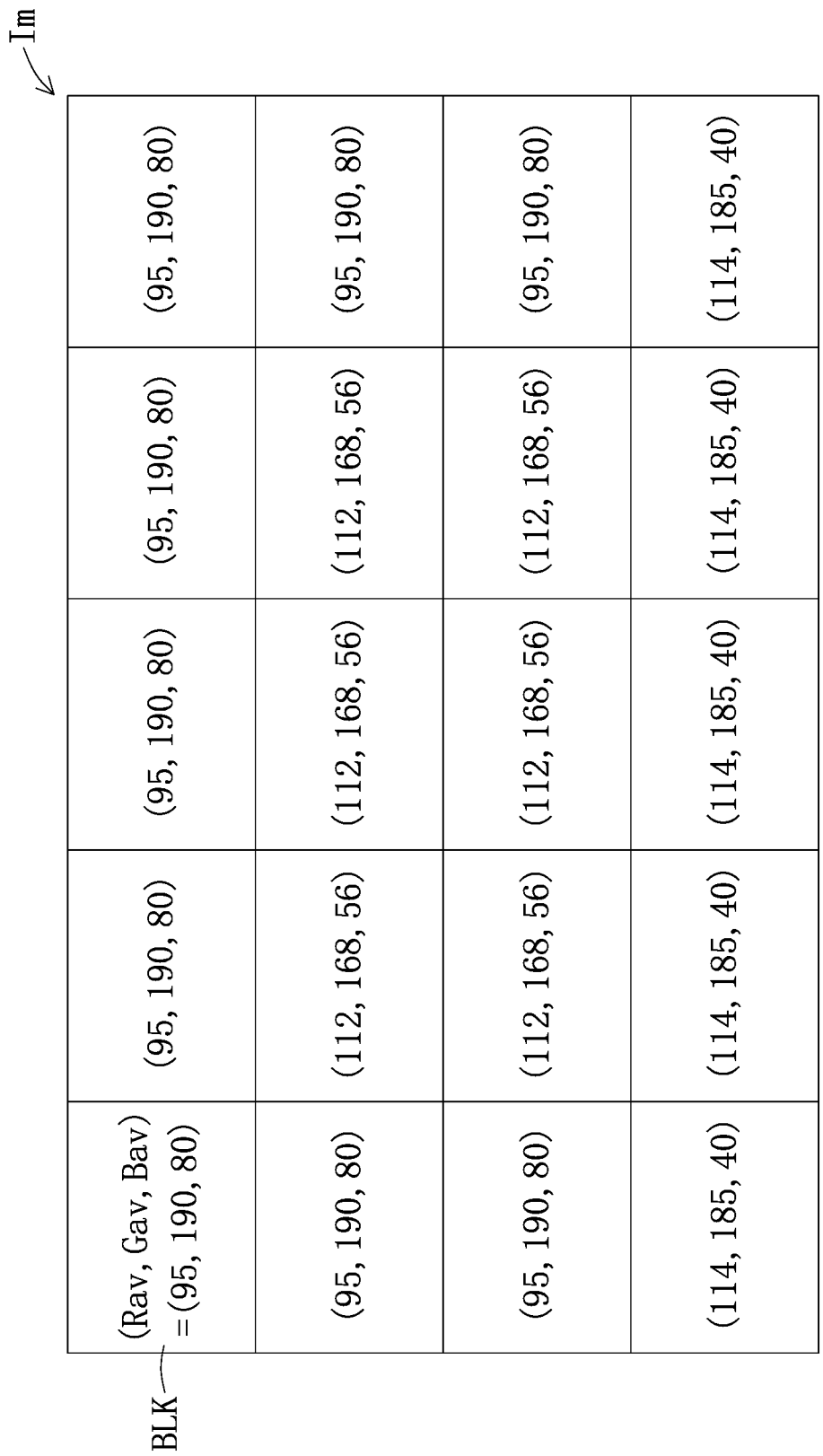
FIG. 4 is a schematic diagram showing a first average component, a second average component and a third average component of each block according to one embodiment of the present disclosure.

If the 20 blocks are interfered with by the skin color data and the color temperature, each of the pixel data of the 20 blocks would change, such that a first average component Rav, a second average component Gav and a third average component Bav of each block BLK may change as shown in FIG. 4. FIG. 4 is a schematic diagram showing a first average component, a second average component and a third average component of each block according to one embodiment of the present disclosure. For example, in the first block BLK, 9 pixel data P0, P1, P2, P15, P16, P17, P30, P31 and P32 are listed in Table 1 as below.

TABLE 1

| P0 = (R, G, B) = (97, 195, 80) | P1 = (95, 191, 81) | P2 = (94, 193, 79) |
| P15 = (95, 189, 82) | P16 = (94, 190, 79) | P17 = (95, 188, 80) |
| P30 = (96, 192, 78) | P31 = (96, 187, 80) | P32 = (93, 185, 81) |

The first average component Rav of the first color components of the pixel data P0 to P2, P15 to P17 and P30 to P32 is 95 (i.e., (97+95+94+95+94+95+96+96+93)/9=95). The second average component Gav of the second color components of the pixel data P0 to P2, P15 to P17 and P30 to P32 is 190 (i.e., (195+191+193+189+190+188+192+187+185)/9=190). The third average component Bav of the third color components of the pixel data P0 to P2, P15 to P17 and P30 to P32 is 80 (i.e., (80+81+79+82+79+80+78+80+81)/9=80). Thus, the first average component Rav, the second average component Gav and the third average component Bav of the first block BLK are (Rav, Gav, Bav)=(95, 190, 80). It should be noted that, the first average component Rav, the second average component Gav and the third average component Bav of other blocks can be calculated in a similar way.

After that, in step S230, the image processor 120 calculates first data and second data according to the first average component, the second average component and the third average component of each block BLK.

Figure 5:
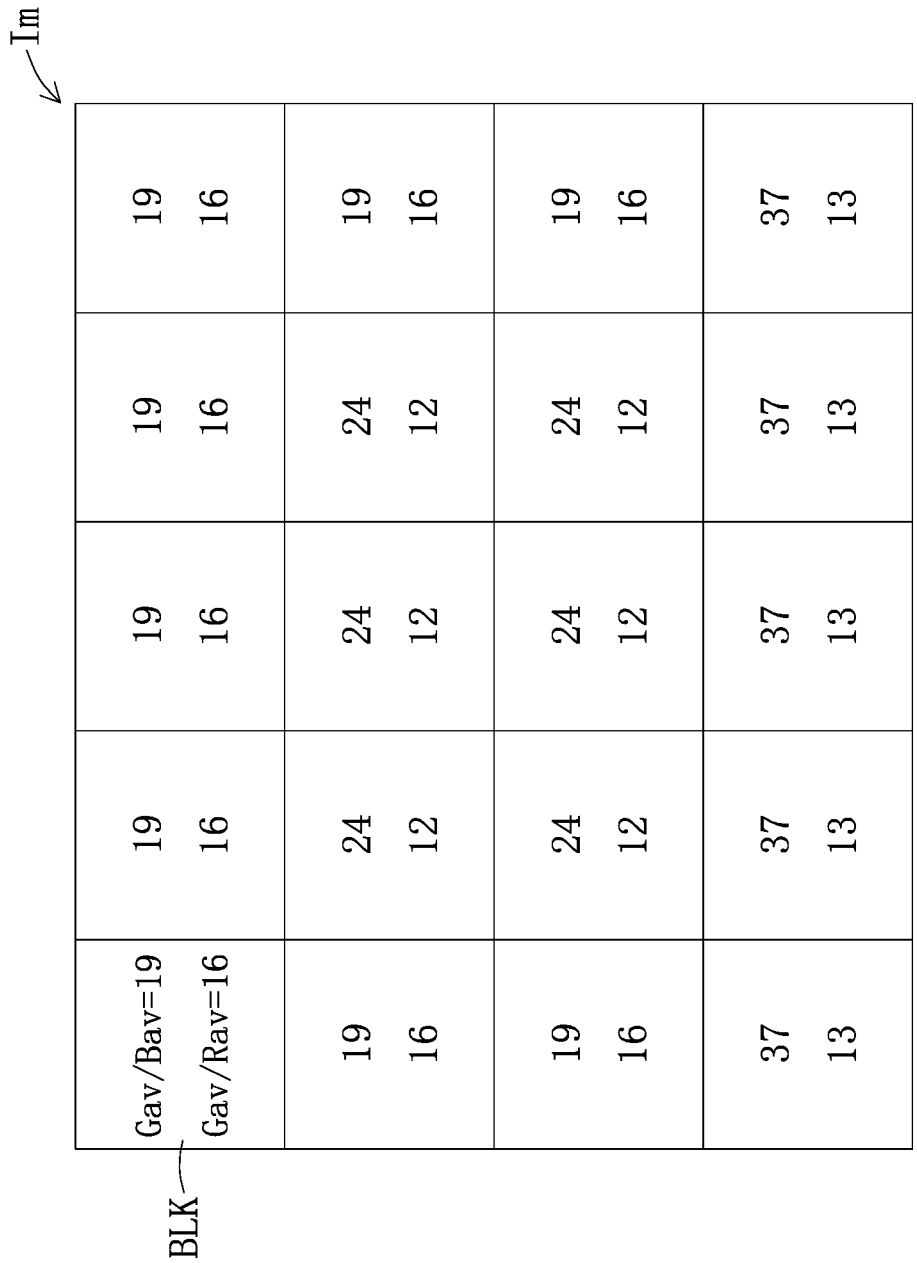
FIG. 5 is a schematic diagram showing first data and second data of each block according to one embodiment of the present disclosure.

FIG. 5 is a schematic diagram showing first data and second data of each block according to one embodiment of the present disclosure. After obtaining the first average components Rav, the second average components Gav and the third average components Bav of the 20 blocks, in the first block BLK, the image processor 120 multiplies a quotient obtained via dividing the second average component Gav by the third average component Bav with a predetermined precision (e.g., 8) to generate the first data, which is 19 (i.e., Gav/Bav=(190/80)*8). Also, the image processor 120 multiples a quotient obtained via dividing the second average component Gav by the first average component Rav with the predetermined precision to generate the second data, which is 16 (i.e., Gav/Rav=(190/95)*8). In the last block, the image processor 120 multiplies a quotient obtained via dividing the second average component Gav by the third average component Bav with the predetermined precision (e.g., 8) to generate the first data, which is 37 (i.e., (185/40)*8). Also, the image processor 120 multiples a quotient obtained via dividing the second average component Gav by the first average component Rav with the predetermined precision to generate the second data, which is 13 (i.e., (185/114)*8). It should be noted that, the first data and the second data can be obtained in a similar way.

In another embodiment, when the first color component refers to a brightness Y, the second color component refers to a blue chrominance Cb, and the third color component refers to a red chrominance Cr, the image processor 120 can also obtain the first average component, the second average component and the third average component in the way described above. Then, the image processor 120 can take the second average component (i.e., the blue chrominance Cb) as the first data and take the third average component (i.e., the red chrominance Cr) as the second data, but is not limited thereto.

Figure 6:
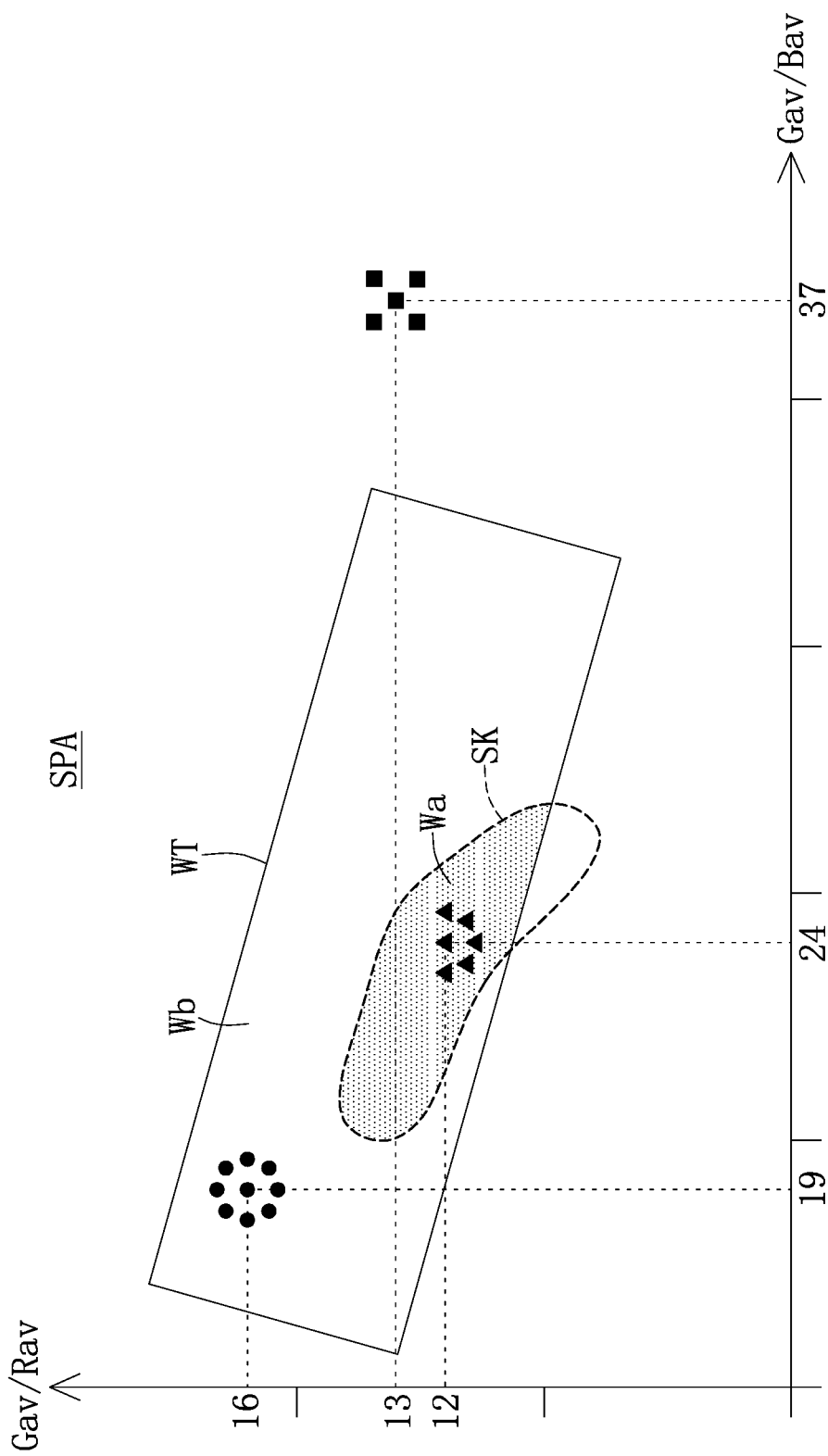
FIG. 6 is a schematic diagram showing relationship among blocks with respect to a color space according to one embodiment of the present disclosure.

In step S240, the image processor 120 maps each block BLK to a position coordinate of a color space SPA according to the first data and the second data. FIG. 6 is a schematic diagram showing relationship among blocks with respect to a color space according to one embodiment of the present disclosure. In this embodiment, the color space SPA is formed according to the first data (i.e., Gav/Bav) and the second data (i.e., Gav/Rav). In the first block, the image processor 120 takes the first data (i.e., Gav/Bav=19) and the second data (i.e., Gav/Rav=16) as the position coordinate in the color space SPA, and the position coordinate of the first block in the color space SPA is represented by a circle as shown in FIG. 6.

Similarly, in the seventh block, the image processor 120 takes the first data (i.e., Gav/Bav=24) and the second data (i.e., Gav/Rav=12) as the position coordinate in the color space SPA, and the position coordinate of the first block in the color space SPA is represented by a triangle as shown in FIG. 6. In the last block, the image processor 120 takes the first data (i.e., Gav/Bav=37) and the second data (i.e., Gav/Rav=13) as the position coordinate in the color space SPA, and the position coordinate of the first block in the color space SPA is represented by a square as shown in FIG. 6.

In this manner, the 20 blocks can be mapped to the 20 position coordinates in the color space SPA. As shown in FIG. 6, in the color space SPA, 9 blocks BLK have the same position coordinate, which is (19, 16) and represented by a circle, 6 blocks have the same position coordinate, which is (24, 12) and represented by a triangle, and 5 blocks have the same position coordinate, which is (37, 12) and represented by a square.

It is worth mentioning that, a white region WT (surrounded by a solid line in FIG. 6) and a skin color region SK (surrounded by a dotted line in FIG. 6) are built in the color space. The white region WT includes white colors at different color temperatures, and the skin color region SK includes skin colors at different color temperatures. Those skilled in the art should be able to understand the definition of the white region WT in the color space SPA, so relevant details are omitted herein.

As to the skin color region SK, the image processor 120 may make statistics for skin colors of human faces after receiving an input image Im, and then defines the skin color region SK in the color space SPA according to the statistics. However, how the skin color region SK is defined is not restricted by the present disclosure.

Figure 7:
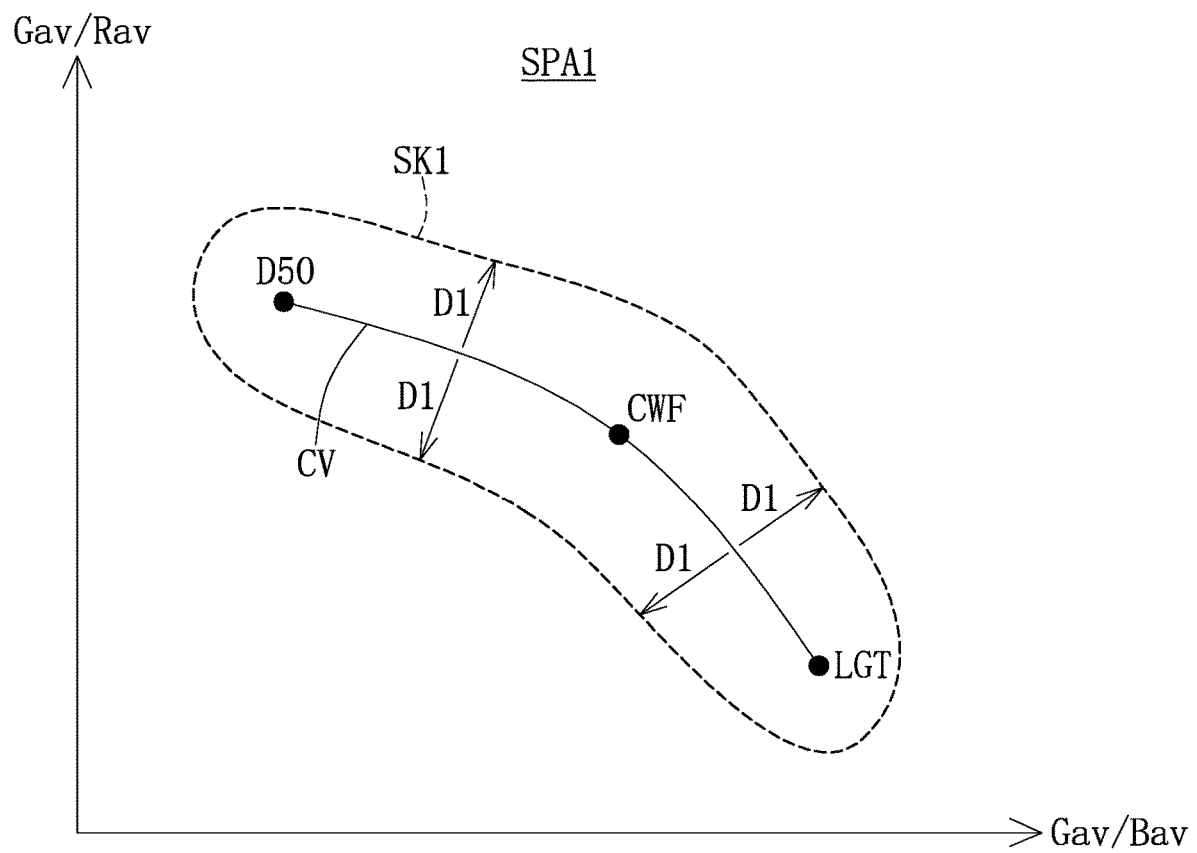
FIG. 7 is a schematic diagram showing a skin color region in a color space according to one embodiment of the present disclosure.

For example, a user can create a skin color chart in advance, and then build the skin color region SK in the color space SPA based on the skin color chart. For another example, as shown in FIG. 7, a skin color curve CV can be calculated at different color temperatures, such as a color temperature D50, a color temperature CWF and a color temperature LGT. Then, a skin color region SK1 in a color space SPA1 may be formed by being spread around the skin color curve CV by a predetermined distance D1.

Figure 8A:
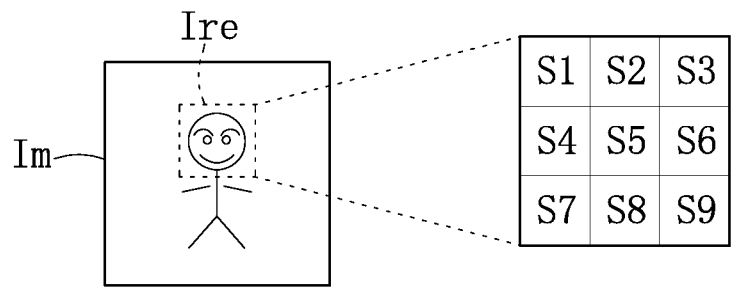
FIG. 8A is a schematic diagram showing a skin color data in a color space according to one embodiment of the present disclosure.
Figure 8B:
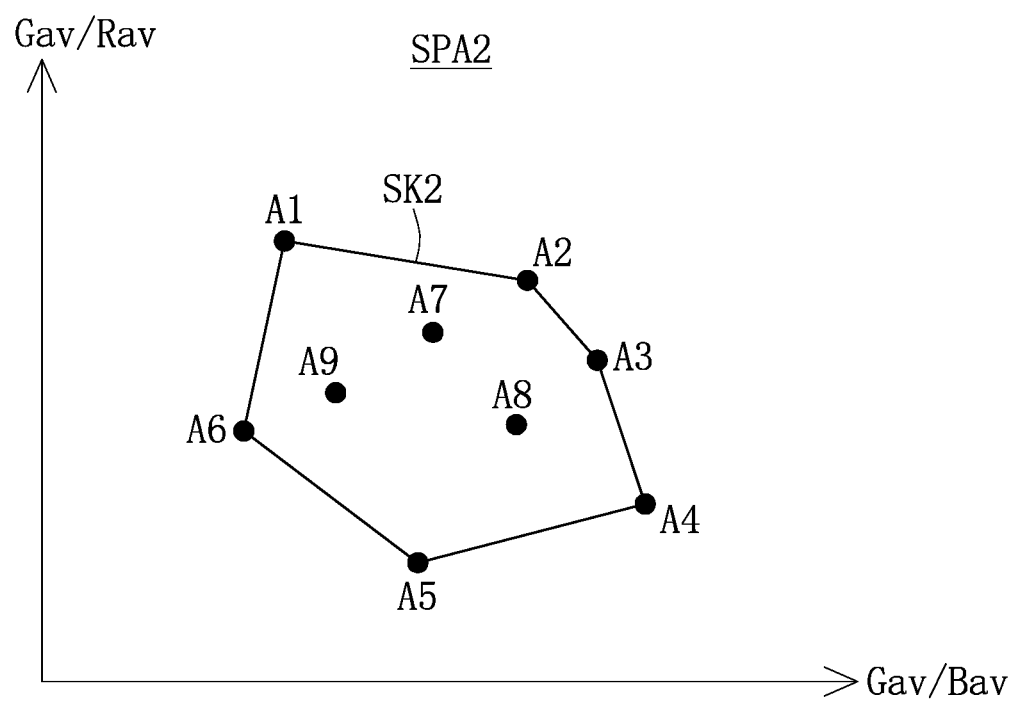
FIG. 8B is a schematic diagram showing a skin color region in a color space according to another embodiment of the present disclosure.

For another example, as shown in FIG. 8A, the image processor 120 captures a region image Ire from the input image Im after the image capturing device 110 receives the input image Im. Then, as shown in FIG. 8B, the image processor 120 maps each of the pixel data S1, S2, S3, S4, S5, S6, S7, S8 and S9 of the region image Ire to one of color coordinates A1, A2, A3, A4, A5, A6, A7, A8 and A9 in a color space SPA2 according to its first color component, second color component and third color component. Then, the image processor 120 builds a skin color region SK2 in the color space SPA2 according to the color coordinates A1, A2, A3, A4, A5, A6, A7, A8 and A9. That is, the skin color region SK2 is surrounded by the color coordinates A1, A2, A3, A4, A5 and A6. It is worth mentioning that, how to define the skin color region SK2 is not restricted. For example, the skin color region SK2 can be formed by connecting the color coordinates A1, A2, A3, A4, A5, A6, A7, A8 and A9 together.

In FIG. 6, the color space SPA has the white region WT (surrounded by a solid line), the skin color region SK (surrounded by a dotted line) and the 20 coordinates of the 20 blocks BLK. The white region WT includes an overlapping region Wa (marked by dots) and a non-overlapping region Wb. The overlapping region Wa is where the white region WT overlaps the skin color region SK, and the non-overlapping region Wb is where the white region WT does not overlap the skin color region SK. It should be noted that, in the color space SPA, the skin color region SK is close to the white region WT at the low color temperature, as shown by the position coordinate (24, 12) of six blocks BLK in the overlapping region Wa. After that, the image processor 120 reduces errors of the white balance calibration due to excessive skin color data according to position coordinates of blocks in the skin color region SK.

As shown in FIG. 2, after calculating the position coordinate of each block BLK in the color space SPA, in step S250, to determine whether the blocks BLK in the skin color region SK fall within the white region WT at the low color temperature, the image processor 120 determines whether a number of position coordinates of the blocks BLK in the skin color region SK is smaller than a predetermined number (e.g., 16).

When the number of position coordinates of the blocks BLK in the skin color region SK is smaller than the predetermined number, it indicates that the blocks BLK in the skin color region SK do not fall within the white region WT at the low color temperature. In this case, in step S260, the image processor 120 calculates weighted averages of the first data and the second data of each block BLK in the white region WT to generate a first weight value w1 and a second weight value w2. Then, in step S265, the image processor 120 converts the first weight value w1 and the second weight value w2 to a first gain value and a second gain value according to a predetermined precision. It should be noted that, weight values of the first data and the second data used to calculate the first weight value and the second weight value are 1 or less, which indicates that the blocks BLK in the skin color region SK do not fall within the white region WT at the low color temperature.

Figure 9A:
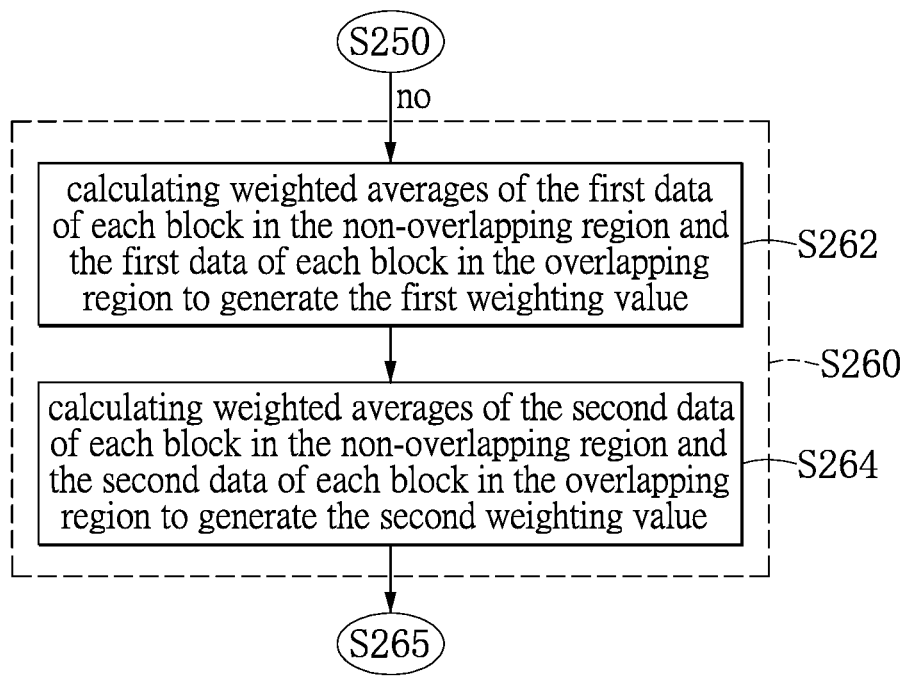
FIG. 9A shows a flow chart of step S260 of a white balance calibration method based on skin color data according to one embodiment of the present disclosure.

FIG. 9A shows a flow chart of step S260 of a white balance calibration method based on skin color data according to one embodiment of the present disclosure. In step S262, when the number of position coordinates of the blocks BLK in the skin color region SK is smaller than the predetermined number (e.g., 16), the image processor 120 calculates weighted averages of the first data of each block BLK in the non-overlapping region Wb (e.g., 9 blocks BLK marked as circles in FIG. 6) and the first data of each block BLK in the overlapping region Wa (e.g., 6 blocks marked as triangles in FIG. 6) to generate the first weight value w1. It should be noted that, weight values of the first data of each block BLK in the overlapping region Wa used to calculate the first weight value are smaller than weight values of the first data of each block BLK in the non-overlapping region Wb used to calculate the first weight value. In this embodiment, the weight values of the first data of each block BLK in the non-overlapping region Wb are 1, and the weight values of the first data of each block BLK in the overlapping region Wa decrease from 1 to a minimum weight value with a decrease of a number of the blocks in the overlapping region Wa.

In step S264, the image processor 120 calculates weighted averages of the second data of each block BLK in the non-overlapping region Wb (e.g., the 9 blocks marked as the circles in FIG. 6) and the second data of each block BLK in the overlapping region Wa (e.g., the 6 blocks marked as the triangles in FIG. 6) to generate the second weight value w2. It should be noted that, weight values of the second data of each block BLK in the overlapping region Wa used to calculate the second weight value w2 are smaller than weight values of the second data of each block BLK in the non-overlapping region Wb used to calculate the second weight value w2. In this embodiment, the weight values of the second data of each block BLK in the non-overlapping region Wb are 1, and weight values of the first data of each block BLK in the overlapping region Wa decrease from 1 to a minimum weight value along with a decrease of a number of the blocks in the overlapping region Wa.

Figure 9B:
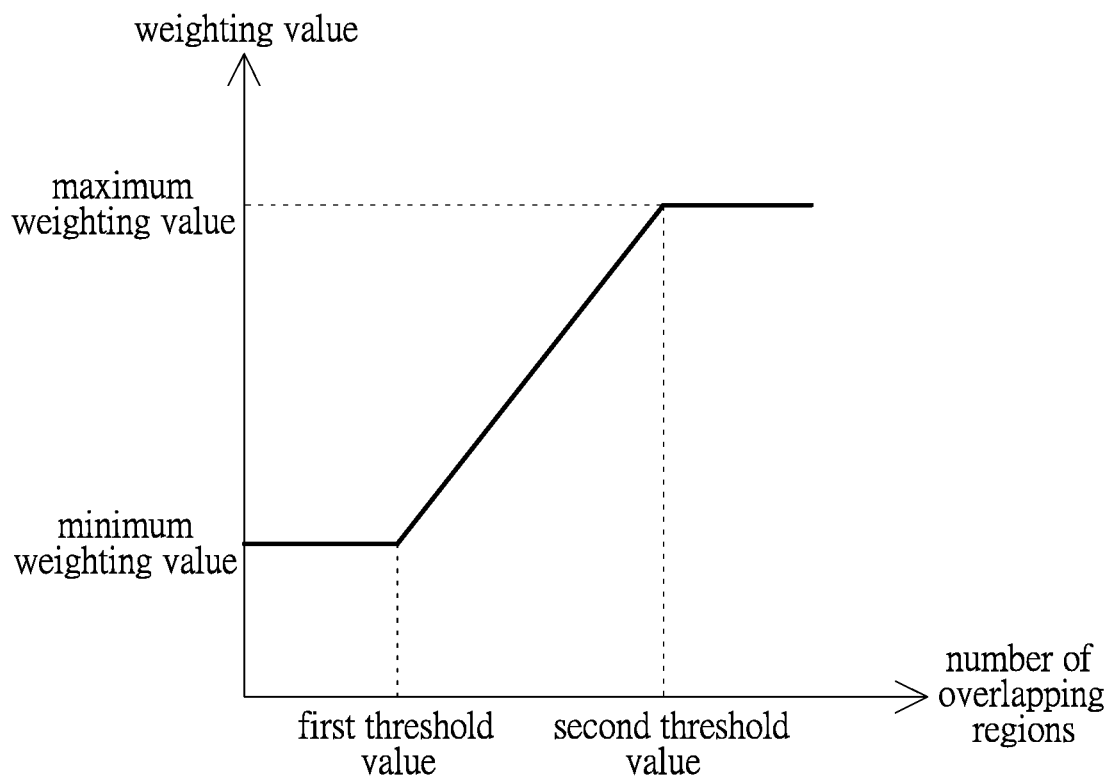
FIG. 9B is a schematic diagram showing relationships between a number of overlapping regions and weight values according to one embodiment of the present disclosure.

FIG. 9B is a schematic diagram showing relationships between numbers of overlapping regions and weight values according to one embodiment of the present disclosure. The weight values above are adjusted according to relationships in FIG. 9B. When the number of the blocks BLK in the overlapping region Wa is smaller than a first threshold value (e.g., 10), the weight value will be decreased to the minimum weight value to reduce effects of the white balance calibration in the blocks BLK in the overlapping region Wa. In addition, when the number of the blocks BLK in the overlapping region Wa is larger than a second threshold value (e.g., 16), the weight value will be still a maximum weight value, which indicates the white region WT at the low color temperature. Moreover, when the number of the blocks BLK in the overlapping region Wa is within a range from the first threshold value (e.g., 10) to the second threshold value (e.g., 16), the weight value will decrease from 1 to the minimum weight value with a decrease of the number of the blocks in the overlapping region Wa. In other words, the weight value is progressively adjusted to avoid a drastic white balance calibration.

For the 20 position coordinates of the 20 blocks in FIG. 6, if the minimum weight value and the maximum weight value are respectively 0.1 and 1, and the first threshold and the second threshold are respectively 10 and 16, the image processor 120 will calculate the weight value of the non-overlapping region Wb as 1 and calculate the weight value of the overlapping region Wa as 0.1. The image processor 120 calculates the weighted averages of the first data of each block BLK in the non-overlapping region Wb (e.g., the 9 blocks marked as the circles in FIG. 6) and the first data of each block BLK in the overlapping region Wa (e.g., the 6 blocks marked as the triangles in FIG. 6) to generate the first weight value w1. In this case, the first weight value w1 is 19 (i.e., (19*9*1+24*6*0.1)/(9*1+6*0.1)). In addition, the image processor 120 calculates the weighted averages of the second data of each block BLK in the non-overlapping region Wb (e.g., the 9 blocks marked as circles in FIG. 6) and the second data of each block BLK in the overlapping region Wa (e.g., the 6 blocks marked as triangles in FIG. 6) to generate the second weight value w2. In this case, the second weight value w2 is 16 (i.e., (16*9*1+12*6*0.1)/(9*1+6*0.1)).

After that, the image processor 120 converts the first weight value w1 and the second weight value w2 to a first gain value Gn1 and a second gain value Gn2 according to a predetermined precision. For example, the predetermined precision can be 8. In this case, the first gain value Gn1 is 2.375 (i.e., 19/8) and a second gain value Gn2 is 2 (i.e., 16/8).

When the number of the blocks BLK in the skin color region SK is larger than a predetermined number, it indicates that the blocks BLK in the skin color region SK fall within the white region WT at the low color temperature. In this case, in step S270, the image processor 120 averages the first data of each block BLK in the white region WT to generate a first average value av1, and averages the second data of each block BLK in the white region WT to generate a second average value av2. Then, in step S275, the image processor 120 converts the first average value av1 and the second average value av2 to the first gain value Gn1 and the second gain value Gn2 according to the predetermined precision. It should be noted that, the first average value av1 is larger than the first weight value w1, and the second average value av2 is larger than the second weight value w2.

For the 20 position coordinates of the 20 blocks in FIG. 6, the image processor 120 averages the first data of 15 blocks BLK (e.g., the 9 blocks marked as the circles and the 6 blocks marked as the triangles in FIG. 6) in the white region WT to generate the first average value av1. In this case, the first average value av1 is 21 (i.e., (19*9+24*6)/15). Also, the image processor 120 averages the second data of 15 blocks BLK (e.g., the 9 blocks marked as the circles and the 6 blocks marked as the triangles in FIG. 6) in the white region WT to generate the second average value av2. In this case, the second average value av2 is 14 (i.e., (16*9+12*6)/15).

After that, the image processor 120 converts the first average value av1 and the second average value av2 to the first gain value Gn1 and the second gain value Gn2 according to the predetermined precision. For example, the predetermined precision is 8. In this case, the first gain value Gn1 is 2.625 (i.e., 21/8) and the second gain value Gn2 is 1.75 (i.e., 14/8).

Finally, in step S280, the image processor 120 adjusts the first color component, the second color component and the third color component of each pixel datum according to the first gain value Gn1 and the second gain value Gn2.

When the first color component refers to a red saturation, the second color component refers to a green saturation and the third color component refers to a blue saturation, in FIG. 6, if the number of the blocks BLK in the overlapping region Wa is smaller than a predetermined number, the image processor 120 converts the first weight value (i.e., 19) and the second weight value (i.e., 16) respectively to the first gain value Gn1, which is 2.375, and the second gain value Gn2, which is 2.

Then, the image processor 120 multiplies the third color component by the first gain value Gn1, multiplies the first color component by the second gain value Gn2, and maintains the second color component as original. According to the Table 1, the pixel data P0 (R, G; B) of the first block BLK in FIG. 3 is (97, 195, 80). In this case, the adjusted pixel data P0' (R', G', B') of the first block BLK in FIG. 3 will be (97*2, 195, 80*2.375), which is (194, 195, 190). The nine adjusted pixel data P0', P1', P2', P15', P16', P17', P30, P31' and P32' can be listed in Table 2 as below.

TABLE 2

| P' = (R, G, B) = (194, 195, 190) | P15' = (190, 191, 192) | P2' = (188, 193, 188) |
|---|---|---|
| P15' = (190, 189, 195) | P16' = (188, 190, 188) | P17' = (190, 188, 190) |
| P30' = (192, 192, 185) | P31' = (192, 187, 190) | P32' = (186, 185, 192) |

According to the Table 2, the first average component Rav' of the first color components of the adjusted pixel data P0' to P2', P15' to P17' and P30' to P32' in the first block BLK is (194+190+188+190+188+190+192+192+186)/9, which is 190. The second average component Gav' of the second color components of the adjusted pixel data P0' to P2', P15' to P17' and P30' to P32' in the first block BLK is (195+191+193+189+190+188+192+187+185)/9, which is 190. The third average component Bav' of the third color components of the adjusted pixel data P0' to P2', P15' to P17' and P30' to P32' in the first block BLK is (190+192+188+195+188+190+185+190+192)/9, which is 190.

In another embodiment, the first color component refers to the brightness Y, the second color component refers to the blue chrominance Cb, and the third color component refers to the red chrominance Cr. In this case, the image processor 120 multiplies the second color component (i.e., the blue chrominance Cb) by the first gain value, and multiplies the third color component (i.e., the red chrominance Cr) by the second gain value to generate a second gain value.

From the above, in the first block BLK in FIG. 4, (Rav, Gav, Bav) is adjusted as (Rav', Gav', Bav'), which is (190, 190, 190), such that the first average component, the second average component and the third average component are adjusted to be closer to the actual color (e.g., grey). In short, in the present disclosure, an input image is divided into a plurality of blocks and a pixel average value of each block (i.e., the first average component, the second average component and the third average component) is calculated. After that, a number of the blocks in a white region (including white colors at different color temperatures) and a number of the blocks in a skin color region (including skin colors at different color temperatures) are calculated. Then, a weight allocation is performed in the blocks in the white region according to the pixel average values of the blocks, the number of the blocks in the white region and the number of the blocks in the skin color region to generate white balance gains (i.e., the above described first gain value and second gain value). Finally, each pixel of the input image is multiplied by a white balance gain to complete the white balance calibration process.

To sum up, in the present disclosure, the white balance calibration method based on skin color data and the image processing apparatus using the same can adaptively perform a weight allocation based on the skin color data to generate white balance gains. The white balance gains can reduce errors caused by the white balance calibration due to excessive skin color data of the input image. Therefore, the present disclosure can further solve an issue that in video applications, the white balance calibration is easily interfered by a large amount of the skin color data. Moreover, the present disclosure may be adapted to different color temperatures and output images having colors closer to actual colors.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A white balance calibration method based on skin color data, adapted to an image processing apparatus, comprising:
    receiving a plurality of pixel data of an input image, wherein each of the pixel data includes a first color component, a second color component and a third color component;
    dividing the input image into a plurality of blocks, and calculating a first average component of the first color components, a second average component of the second color components and a third average component of the third color components of each block;
    calculating first data and second data according to the first average component, the second average component and the third average component of each block;
    mapping each block to a position coordinate of a color space according to the first data and the second data, wherein a white region and a skin color region are built in the color space, the white region includes white colors at different color temperatures, and the skin color region includes skin colors at different color temperatures;
    determining whether a number of the blocks in an overlapping region of the white region and the skin color region is smaller than a predetermined number, and when the number of the blocks in the overlapping region of the white region and the skin color region is smaller than the predetermined number, calculating weighted averages of the first data and the second data of each block in the white region to generate a first weight value and a second weight value and converting the first weight value and the second weight value to a first gain value and a second gain value according to a predetermined precision, wherein a weighted value of each of the first data and each of the second data used to calculate the first weighting value and the second weighting value is 1 or less; and
    adjusting the first color component, the second color component and the third color component of each of the pixel data according to the first gain value and the second gain value.

2. The white balance calibration method according to claim 1, further comprising:
    when the number of the blocks in the overlapping region of the white region and the skin color region is larger than or equal to the predetermined number, averaging the first data and the second data of each block in the white region to generate a first average value and a second average value and converting the first average value and the second average value to the first gain value and the second gain value according to the predetermined precision;
    wherein the first average value is larger than the first weight value, and the second average value is larger than the second weight value.

3. The white balance calibration method according to claim 1, wherein the white region includes a non-overlapping region where the white region does not overlap with the skin color region, and the step of calculating the first weight value and the second weight value further includes:

calculating weighted averages of the first data of each block in the non-overlapping region and the first data of each block in the overlapping region to generate the first weight value, wherein a weight value of the first data in the overlapping region used to calculate the first weighting value are smaller than a weight value of the first data in the non-overlapping region used to calculate the first weighting value; and calculating weighted averages of the second data of each block in the non-overlapping region and the second data of each block in the overlapping region to generate the second weight value, wherein a weight value of the second data in the overlapping region used to calculate the second weighting value are smaller than a weight value of the second data in the non-overlapping region used to calculate the second weighting value.

4. The white balance calibration method according to claim 3, wherein the weight value of each of the first data and the second data in the non-overlapping region used to calculate the first weighting value and the second weighting value is 1, and the weight value of each of the first data and the second data in the overlapping region used to calculate the first weighting value and the second weighting value decreases from 1 to a minimum weight value along with a decrease of a number of the blocks in the non-overlapping region.

5. The white balance calibration method according to claim 1, wherein the step of calculating the first average component, the second average component and the third average component for each block further includes:
averaging the first color components to generate the first average component;
averaging the second color components to generate the second average component; and
averaging the third color components to generate the third average component.

6. The white balance calibration method according to claim 1, wherein the first color component refers to a red saturation, the second color component refers to a green saturation and the third color component refers to a blue saturation, and the step of calculating the first data and the second data further includes:
multiplying a quotient obtained via dividing the second average component by the third average component with the predetermined precision to generate the first data; and
multiplying a quotient obtained via dividing the second average component by the first average component with the predetermined precision to generate the second data.

7. The white balance calibration method according to claim 6, wherein the step of adjusting the first color component, the second color component and the third color component of each pixel datum further includes:
multiplying the first gain value by the third color component; and
multiplying the second gain value by the first color component.

8. The white balance calibration method according to claim 1, wherein the first color component refers to a brightness, the second color component refers to a blue saturation, the third color component refers to a red saturation, and the step of calculating the first data and the second data further includes:
taking the second average component as the first data; and
taking the third average component as the second data.

9. The white balance calibration method according to claim 8, wherein the step of adjusting the first color component, the second color component and the third color component of each pixel datum further includes:
multiplying the first gain value by the second color component; and
multiplying the second gain value by the third color component.

10. The white balance calibration method according to claim 1, wherein the step of building the skin color region in the color space further includes:
calculating a skin color curve according to the skin colors at different color temperatures; and
forming the skin color region by being spread around the skin color curve by a predetermined distance.

11. The white balance calibration method according to claim 1, wherein the step of building the skin color region in the color space further includes:
capturing a region image of a human face from the input image;
mapping each pixel datum of the region image to a skin color coordinate of the color space according to the first color component, the second color component and the third color component; and
building the skin color region in the color space according to each skin color coordinate.

12. The white balance calibration method according to claim 11, wherein the step of building the skin color region in the color space according to each skin color coordinate further includes:
connecting each of the skin color coordinates to form the skin color region.

13. An image processing apparatus, comprising:
an image capturing device, receiving an input image, wherein the input image includes pixel data; and
an image processor, electrically connected to the image capturing device to:
receive the pixel data of the input image, wherein each of the pixel data includes a first color component, a second color component and a third color component;
divide the input image into a plurality of blocks, and calculate a first average component of the first color components, a second average component of the second color components and a third average component of the third color components for each block;
calculate first data and second data according to the first average component, the second average component and the third average component for each block;
map each block to a position coordinate of a color space according to the first data and the second data, wherein a white region and a skin color region are built in the color space, the white region includes white colors at different color temperatures, and the skin color region includes skin colors at different color temperatures;
determine whether a number of the blocks in an overlapping region of the white region and the skin color region is smaller than a predetermined number, and when the number of the blocks in the overlapping region of the white region and the skin color region is smaller than the predetermined number, calculate weighted averages of the first data and the second data of each block in the white region to generate a first weight value and a second weight value and convert the first weight value and the second weight value to a first gain value and a second gain value according to a predetermined precision, wherein a weight value of each of the first data and each of the second data used to calculate the first weighting value and the second weighting value is 1 or less; and adjust the first color component, the second color component and the third color component of each pixel datum according to the first gain value and the second gain value.

14. The image processing apparatus according to claim 13,
wherein when the number of the blocks in the overlapping region of the white region and the skin color region is larger than or equal to the predetermined number, the image processor averages the first data and the second data of each block in the white region to generate a first average value and a second average value and converts the first average value and the second average value to the first gain value and the second gain value according to the predetermined precision;
wherein the first average value is larger than the first weight value, and the second average value is larger than the second weight value.

15. The image processing apparatus according to claim 13,
wherein the white region includes a non-overlapping region where the white region does not overlap the skin color region, and when calculating the first weight value and the second weight value, the image processor is configured to:
calculate weighted averages of the first data of each block in the non-overlapping region and the first data of each block in the overlapping region to generate the first weight value, wherein the weight values of the first data of each block in the overlapping region used to calculate the first weight value are smaller than weight values of the first data of each block in the non-overlapping region used to calculate the first weighting value; and
calculate weighted averages of the second data of each block in the non-overlapping region and the second data of each block in the overlapping region to generate the second weight value, wherein the weight value of the second data in the overlapping region weight value are smaller than weight values of the second data of each block in the non-overlapping region used to calculate the second weighting value.

16. The image processing apparatus according to claim 15, wherein weight values of the first data and the second data of each block in the non-overlapping region used to calculate the first weighting value and the second weight value are 1, and weight values of the first data and the second data of each block in the overlapping region used to calculate the first weight value and the second weight value decrease from 1 to a minimum weight value along with a decrease of a number of the blocks in the non-overlapping region.

17. The image processing apparatus according to claim 13, wherein in each block, the image processor averages the first color components to generate the first average component, averages the second color components to generate the second average component, and averages the third color components to generate the third average component.

18. The image processing apparatus according to claim 13, wherein when building the skin color region in the color space, the image processor calculates a skin color curve according to the skin colors at different color temperatures, and the skin color region is formed by being spread around the skin color curve by a predetermined distance.

19. The image processing apparatus according to claim 13, wherein when building the skin color region in the color space, the image processor captures a region image of a human face from the input image, maps each pixel datum of the region image to a skin color coordinate of the color space according to the first color component, the second color component and the third color component of the pixel datum, and builds the skin color region in the color space according to each color coordinate.

20. The image processing apparatus according to claim 19, wherein when building the skin color region in the color space according to each skin color coordinate, the image processor connects the skin color coordinates to form the skin color region.

* * * * *